United States Patent
Wang

(10) Patent No.: US 6,918,314 B2
(45) Date of Patent: Jul. 19, 2005

(54) SHIFT-BY-WIRE TRANSMISSION ACTUATOR ASSEMBLY

(75) Inventor: Yong Q. Wang, Rochester Hills, MI (US)

(73) Assignee: Dura Global Technologies, Inc., Richester Hill, MI (US)

( * ) Notice: Subject to any disclaimer, the term of this patent is extended or adjusted under 35 U.S.C. 154(b) by 0 days.

(21) Appl. No.: 10/161,259

(22) Filed: May 31, 2002

(65) Prior Publication Data

US 2003/0221499 A1 Dec. 4, 2003

(51) Int. Cl.[7] .............................................. F16H 61/00
(52) U.S. Cl. .................. 74/335; 74/473.12; 74/473.15; 74/473.18
(58) Field of Search ............................ 477/906; 74/335, 74/339, 473.12, 473.18, 473.15, 475.15

(56) References Cited

U.S. PATENT DOCUMENTS

| | | | |
|---|---|---|---|
| 4,463,628 A | * | 8/1984 | Ahlschwede et al. .... 74/473.18 |
| 4,843,901 A | * | 7/1989 | Peterson et al. .............. 74/335 |
| 4,892,014 A | | 1/1990 | Morell et al. ................. 74/866 |
| 4,912,997 A | * | 4/1990 | Malcolm et al. .......... 74/473.12 |
| 5,035,158 A | | 7/1991 | Leigh-Monstevens ........ 74/886 |
| 5,370,015 A | * | 12/1994 | Moscatelli ............... 74/473.12 |
| 5,741,202 A | | 4/1998 | Huber ......................... 477/124 |
| 6,016,717 A | * | 1/2000 | Wheeler .................. 74/473.12 |
| 6,196,078 B1 | | 3/2001 | DeJonge et al. ......... 74/473.12 |
| 6,295,887 B1 | | 10/2001 | DeJonge et al. ........... 74/473.3 |
| 6,378,393 B1 | * | 4/2002 | Bates ....................... 74/473.18 |
| 6,484,598 B2 | * | 11/2002 | Peter ....................... 74/473.12 |
| 2002/0045506 A1 | * | 4/2002 | Scheuerer ...................... 475/5 |
| 2002/0084149 A1 | * | 7/2002 | Heuver ......................... 188/69 |
| 2002/0134185 A1 | * | 9/2002 | Tsuzuki et al. ............ 74/473.1 |
| 2002/0170376 A1 | * | 11/2002 | Giefer et al. ................. 74/532 |

* cited by examiner

Primary Examiner—Ha Ho
(74) Attorney, Agent, or Firm—Peter D. McDermott; Banner & Witcoff Ltd.; Dean B. Watson

(57) ABSTRACT

An actuator for a vehicle transmission having both a shift-by-wire mode and a manual override mode includes a motor and a gear assembly driven by the motor when the vehicle transmission is in a shift-by-wire mode. An output member of the gear assembly is configured to mate with the vehicle transmission. A release member is operable to drive the gear assembly when the vehicle transmission is in a manual override mode.

22 Claims, 7 Drawing Sheets

SHIFT-BY-WIRE TRANSMISSION ACTUATOR ASSEMBLY

FIELD OF THE INVENTION

This invention relates generally to an actuator for a vehicle transmission, and, more particularly, to an actuator for an automatic transmission.

BACKGROUND OF THE INVENTION

Historically, the gears of automatic transmissions for passenger vehicles have been changed by using a shifter in the passenger cabin that is connected to the transmission by a mechanical linkage. The driver typically grasps and moves the shifter to change gears. When shifting between particular gears, e.g., from Park to Reverse, the user must also simultaneously depress a button in order to move the shifter. Recently, electronically controlled shifting systems, commonly referred to as shift-by-wire systems, have been developed. Shift-by-wire systems have an electronic connection to the transmission that effects the changing of gears. In a typical shift-by-wire system, the driver presses a button to select a desired gear, sometimes depressing an additional button in order to shift between particular gears, e.g., from Park to Reverse. An electronic signal is then sent to an actuator that effects shifting of the transmission. Shift-by-wire systems can reduce the space required for the shifting system, reduce assembly problems, decrease costs and increase effectiveness. U.S. Pat. No. 6,196,078 and U.S. Pat. No. 6,295,887 to DeJonge et al., U.S. Pat. No. 4,892,014 to Morell et al., and U.S. Pat. No. 5,035,158 to Leigh-Monstevens all describe shift-by-wire actuators for automatic transmissions.

Many of the known shift-by-wire systems, however, are limiting in that they do not provide a manual override capability for operation of the transmission in the event of loss of power. In certain shift-by-wire systems, a battery backup unit must be provided in order to ensure that the transmission can be shifted in the event of the loss of power, such as when the vehicle needs to be towed.

It is an object of the present invention to provide a shift-by-wire actuator that reduces or wholly overcomes some or all of the difficulties inherent in prior known devices. Particular objects and advantages of the invention will be apparent to those skilled in the art, that is, those who are knowledgeable or experienced in this field of technology, in view of the following disclosure of the invention and detailed description of certain preferred embodiments.

SUMMARY

In accordance with a first aspect, an actuator for a vehicle transmission having both a shift-by-wire mode and a manual override mode includes a motor and a gear assembly driven by the motor when the vehicle transmission is in a shift-by-wire mode. An output member is configured to mate with the vehicle transmission. A release member is operable to drive the gear assembly when the vehicle transmission is in a manual override mode.

In accordance with another aspect, an actuator for a vehicle transmission having both a shift-by-wire mode and a manual override mode includes a motor and a planet gear assembly. The planet gear assembly has a sun gear, a ring gear, and a planet carrier housing at least one planet gear. The planet carrier is configured to mate with the vehicle transmission. A worm gear driven by the motor is operably connected to the sun gear to drive the planet gear assembly when the vehicle transmission is in a shift-by-wire mode. A release member is operably connected to the ring gear to fix the ring gear in a pre-selected position when the solenoid is energized and drive the planet gear assembly when the vehicle transmission is in a manual override mode.

In accordance with a further aspect, an actuator for a vehicle transmission having both a shift-by-wire mode and a manual override mode includes a housing and a motor secured to the housing. A planet gear assembly is positioned in the housing and has a sun gear, a ring gear, and a planet carrier having at least one planet gear and a hub. The hub is configured to mate with the vehicle transmission. A worm gear includes a drive shaft of the motor and a gear, and the gear engages the sun gear to drive the planet gear assembly when the vehicle transmission is in a shift-by-wire mode. A cable is connected at one end to the ring gear, fixes the ring gear in a pre-selected position when the vehicle transmission is in a shift-by-wire mode, and drives the planet gear assembly when the vehicle transmission is in a manual override mode.

In accordance with yet another aspect, an actuator assembly for a vehicle transmission having both a shift-by-wire mode and a manual override mode includes a motor and a planet gear assembly. The planet gear assembly has a sun gear, a ring gear, a planet carrier housing three planet gears, and a hub configured to mate with the vehicle transmission. A worm gear driven by the motor is operably connected to the sun gear to drive the planet gear assembly when the vehicle transmission is in a shift-by-wire mode. A first cable connects a shifter to a control unit to send a signal indicating a desired gear selected by movement of the shifter when the shifter is operated in a shift-by-wire mode. A second cable connects the control unit to the motor to send signals to activate and deactivate the motor. A release member is connected at one end to the shifter and at its other end to the ring gear to fix the ring gear in a pre-selected position when the vehicle transmission is in a shift-by-wire mode and drive the planet gear assembly when the shifter is operated in a manual override mode. A position sensor determines a gear position of the vehicle transmission.

Substantial advantage is achieved by providing a transmission actuator as described herein. In particular, such an actuator enables an automatic transmission to be operated in shift-by-wire mode during normal operation, while also providing a manual override mode that allows a driver to manually shift gears in the event of power loss or another event that disables the shift-by-wire mode. Such an actuator is particularly helpful in the case where the vehicle is disabled and needs to be towed. Actuators as described herein are small, efficient, and can easily be attached to current automatic transmissions. Such a device eliminates the need for a battery backup for an electronic shift-by-wire actuator.

These and additional features and advantages of the invention disclosed here will be further understood from the following detailed disclosure of certain preferred embodiments.

Figure 1:
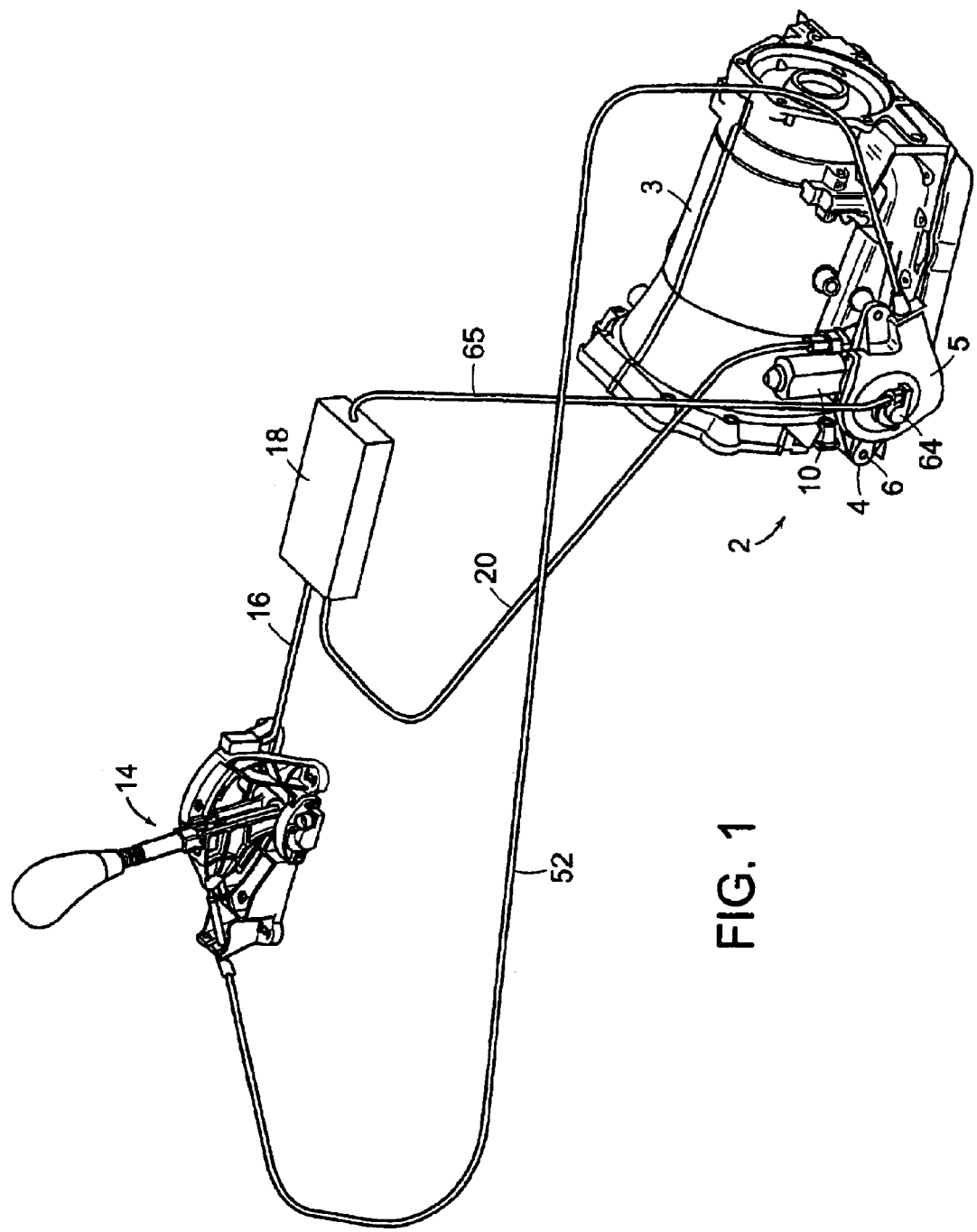
FIG. 1 is a perspective schematic view of an actuator in accordance with the present invention shown attached to a transmission and connected to a shifter and a control unit.

The figures referred to above are not drawn necessarily to scale and should be understood to present a representation of the invention, illustrative of the principles involved. Some features of the actuator depicted in the drawings have been enlarged or distorted relative to others to facilitate explanation and understanding. The same reference numbers are used in the drawings for similar or identical components and features shown in various alternative embodiments. Actuators as disclosed herein will have configurations and components determined, in part, by the intended application and environment in which they are used.

DETAILED DESCRIPTION OF CERTAIN PREFERRED EMBODIMENTS

Although specific preferred embodiments of the actuator disclosed above are now described below, it should be understood that such embodiments are exemplary and serve to illustrate the principles disclosed. Various changes and modifications to the specific embodiments discussed below will become obvious to those skilled in the art in view of the present disclosure, and are deemed to be within the true spirit and scope of the invention as further defined in the appended claims.

In keeping with traditional patent usage, the terms "a," "an," and "the" are used here to mean, and should be understood to mean, "one or more" unless otherwise stated or a contrary meaning is made clear from the particular context. Thus, such terms include the singular and the plural.

It should be understood that directional terms used here refer to the direction shown in the drawings, unless otherwise clear from context.

An actuator 2 for use with an automatic transmission 3 is shown in FIGS. 1–4. Actuator 2 includes a housing 4 and a cover 5. Housing 4 is secured to transmission 3 by way of bolts 6 extending through apertures 8 formed in housing 4 and cover 5. A motor 10 having a drive shaft 12 is secured to housing 4. In certain preferred embodiments, motor 10 is a DC motor.

A user manipulates a shifter 14 to select a desired gear of transmission 3. A suitable shifter is described in commonly assigned U.S. application Ser. No. 10/163,396, entitled "Shift-by-wire Shifter with Mechanical Override," filed on 5 Jun. 2002, the entire disclosure of which is incorporated herein by reference. Other suitable shifters will become readily apparent to those skilled in the art, given the benefit of this disclosure.

Upon movement of shifter 14 between shift position locations, a signal is sent from shifter 14 via a cable 16 to a control unit 18. Control unit 18 sends a signal by way of a cable 20 to motor 10, providing control of the operation of motor 10 and, subsequently, shifting the transmission as required in a shift-by-wire mode. Suitable control units to transmit signals for shift-by-wire transmission systems from shifters to motors for actuating transmissions are well known to those skilled in the art, and further description need not be provided here. It is to be appreciated that cables 16 and 20 may be any type of cable suitable for transmitting a signal from shifter 14 and control unit 18, respectively. In certain preferred embodiments, the respective signals could be transmitted in a wireless mode, with suitable wireless transmitters and receivers incorporated into shifter 14, control unit 18 and motor 10.

In the illustrated embodiment, motor 10 is positioned on an exterior of housing 4 and is bolted or otherwise suitably secured housing 4. Drive shaft 12 of motor 10 extends through an aperture 22 formed in housing 4. It is to be appreciated that in other preferred embodiments motor 10 may be positioned entirely within housing 4. Drive shaft 12 is externally threaded and forms a first portion of a worm gear 24, with a gear 26 forming the second portion of worm gear 24. Worm gear 24 serves to transmit the rotational energy of motor 10 to a gear assembly 28 and act as a speed reducer, while at the same time increasing the torque transmitted. Worm gear 24 has a self-locking function such that gear 26 can rotate in only one direction. Shaft 12 preferably has a single thread with a small lead angle so that gear 26 cannot rotate to drive shaft 12 of motor 10 in a reverse direction.

Figure 5:
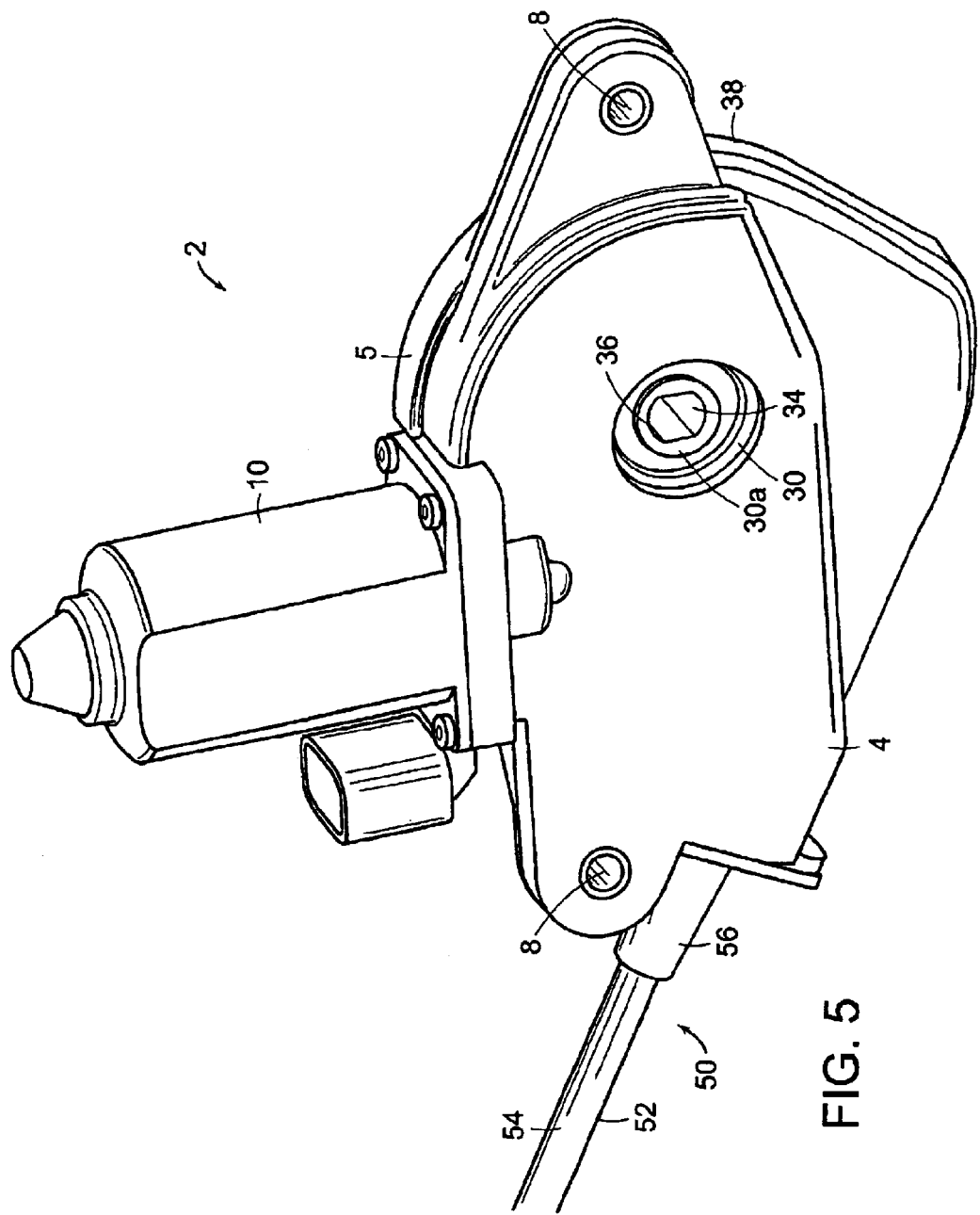
FIG. 5 is a perspective rear view of the actuator of FIG. 1, shown in assembled form within its housing.

Gear assembly 28 is positioned within housing 4. An output member 30 of gear assembly 28 engages an input member (not shown) of transmission 3, such as a transmission shifting shaft, that changes the gear position of transmission 3. In the illustrated embodiment, output member 30 is a rotatable hub 30a having an aperture 34 that receives the transmission shifting shaft. Hub 30a extends through an aperture 32 in housing 4. In the illustrated embodiment, as seen in FIG. 5, aperture 34 is racetrack shaped, with two arcs 36 joined by a pair of opposed flats 38. Aperture 34 mates with a transmission shifting shaft having a similar cross-section. It is to be appreciated that output member 30 may have any configuration or shape in order to mate with a corresponding transmission shifting shaft and transmit the rotational energy of actuator 2 to the transmission for the changing of gears. For example, aperture 34 could have a square, triangular, or any other cross-sectional shape configured to mate with a transmission shifting shaft having a corresponding profile. Other suitable output members for transmitting rotational energy to a transmission shifting shaft will become readily apparent to those skilled in the art, given the benefit of this disclosure.

In certain preferred embodiments, gear assembly 28 includes a planet gear set 40. Planet gear set 40 includes a ring gear 42, a sun gear 44, and three planet gears 46 housed in a planet carrier 48. It is to be appreciated that in certain preferred embodiments, planet gear set 40 can have more or less than three planet gears 46.

In the illustrated embodiment, hub 30a is formed as a unitary extension of planet carrier 48, that is, hub 30a and planet carrier 48 are of one-piece construction, such that hub 30a rotates with planet carrier 48. Aperture 34 extends through both hub 30a and planet carrier 48. Sun gear 44 is rotatingly driven by gear 26 of worm gear 24 during the shift-by-wired mode and, therefore, rotates as gear 26 rotates. An aperture 49 extends through gear 26 and sun gear 44. In the illustrated embodiment, sun gear 44 is unitary with gear 26. It is to be appreciated that in other preferred embodiments, sun gear 44 need not be of unitary construction with gear 26 and hub 30a need not be of unitary construction with planet carrier 48. For example, these members may be connected to one another by an intermediate gear, linkage, or any other suitable member that serves to translate the rotational energy of gear 26 to sun gear 44 and planet carrier 48 to hub 30a.

Other suitable gear assemblies, operable to transmit the rotational energy of motor 10 to a transmission shifting shaft of transmission 3 are also considered to be within the scope of the present invention. For example, a wobble gear assembly could serve to provide the function of gear assembly 28, namely, transmitting rotational energy of motor 10 to the transmission shifting shaft.

A release member 50 is operably connected to gear assembly 28 and shifter 14 for use in operating actuator 2 in a manual override mode. Release member 50 serves as a mechanical linkage between shifter 14 and actuator 2. When the electronic shift-by-wire control of actuator is inactive, such as during a power failure or other electronic system failure, release member 50 serves to translate a mechanical shifting of shifter 14 by a user to gear assembly 28, thereby allowing the gears of transmission 3 to be changed even when the shift-by-wire mode is inactive.

In certain preferred embodiments, release cable 52 is a push-pull cable, or a "Bowden cable," allowing a force to be transmitted in both push and pull applications. In certain preferred embodiments, cable 52 includes a flexible outer sheath 54 secured at one end to housing 4 with a fitting 56 and at its other end to shifter 14 with another fitting (not shown). A flexible core element 58 extends through sheath 54 and can slide longitudinally within sheath 54.

In the illustrated embodiment, a first end of core element 58 is attached to ring gear 42, and its second end is attached to shifter 14. In the illustrated embodiment, an end portion 60 at the first end of core element 58 is received by an aperture 62 formed in a flange 63 of ring gear 42. In the illustrated embodiment end portion 60 extends at substantially a right angle to a longitudinal axis of core element 58. Thus, any force transmitted through release cable 52, such as a pushing or pulling force, acts in a direction perpendicular to the direction of insertion of end portion 60 into aperture 62. It is to be appreciated that core element 58 may be attached to ring gear 42 in any suitable manner that allows forces transmitted through release cable 52 to be transmitted to ring gear 42. For example, another member, such as a pin, a nut and bolt assembly, or any other suitable linking member, could serve to connect core element 58 and ring gear 42 to one another.

Release member 50 serves to secure ring gear 42 in a fixed position during shift-by-wire mode. In this mode, ring gear 42 is typically fixed in a position that corresponds to the Park position of transmission 3. During manual override mode, ring gear is not fixed, and is rotatingly driven by release member 50, as described in greater detail below, thereby acting as the input for gear assembly 28.

Figure 2:
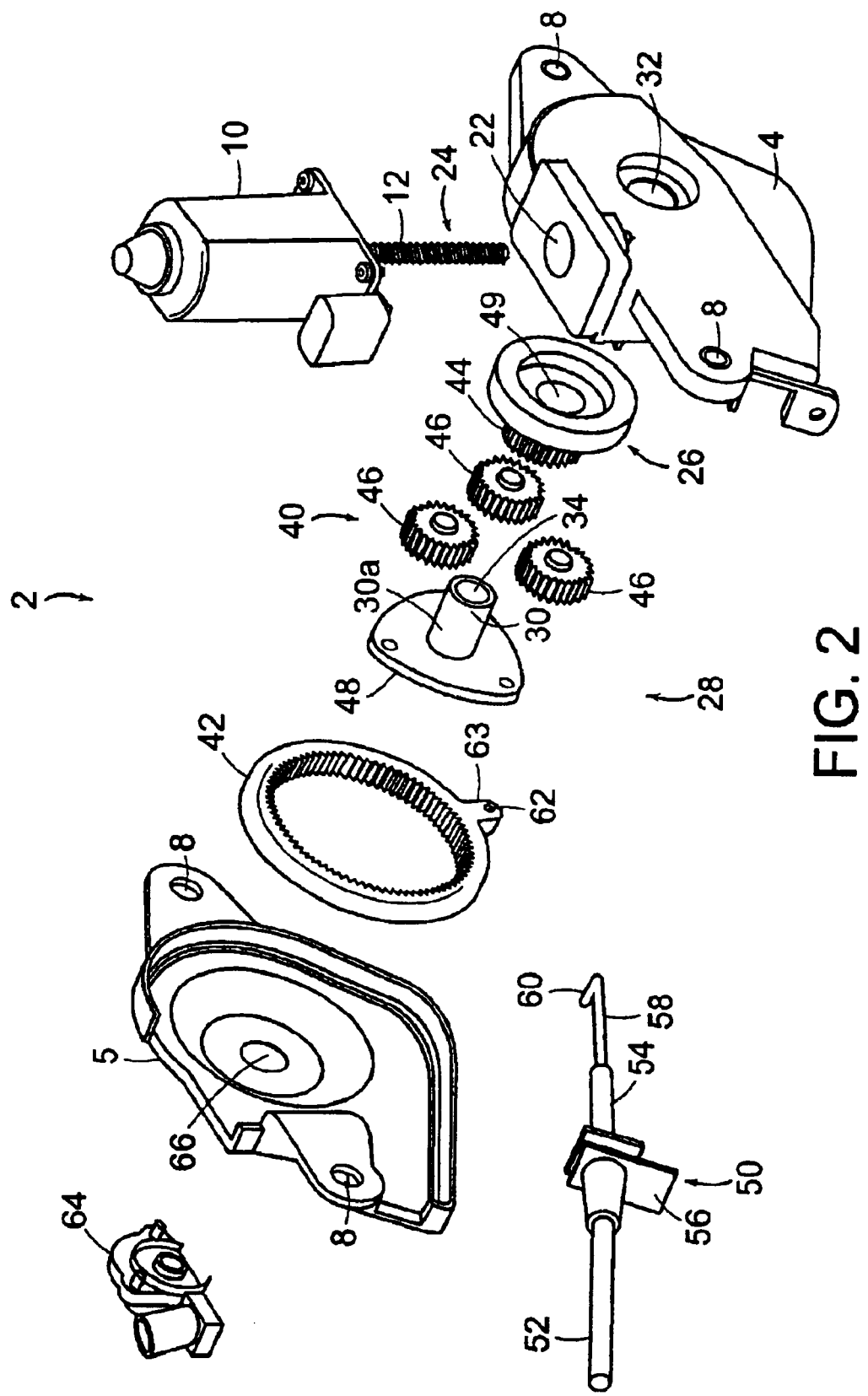
FIG. 2 is a perspective exploded view of the actuator of FIG. 1.
Figure 3:
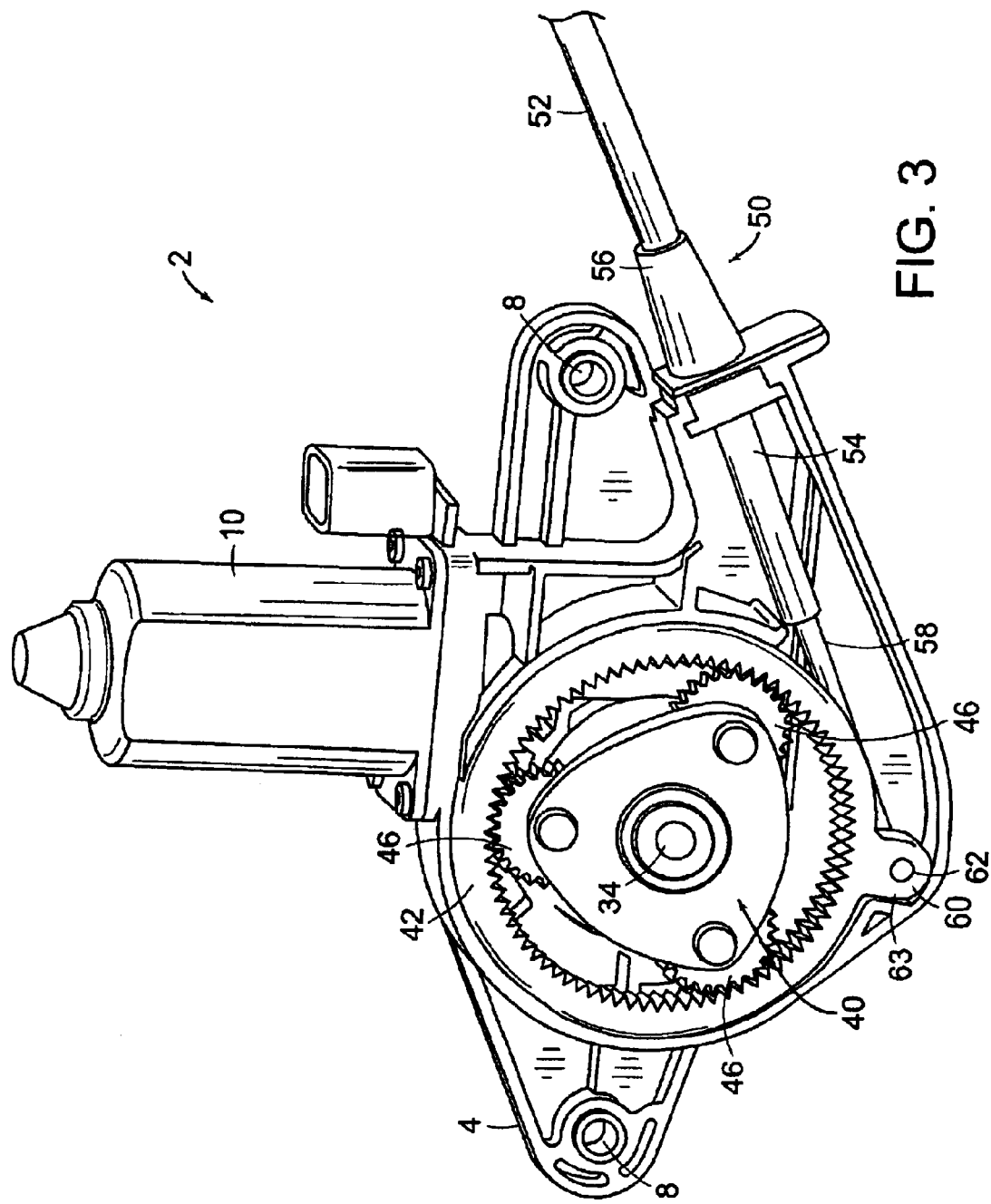
FIG. 3 is a perspective front view of the actuator of FIG. 1, shown in assembled form within its housing and without its cover.
Figure 4:
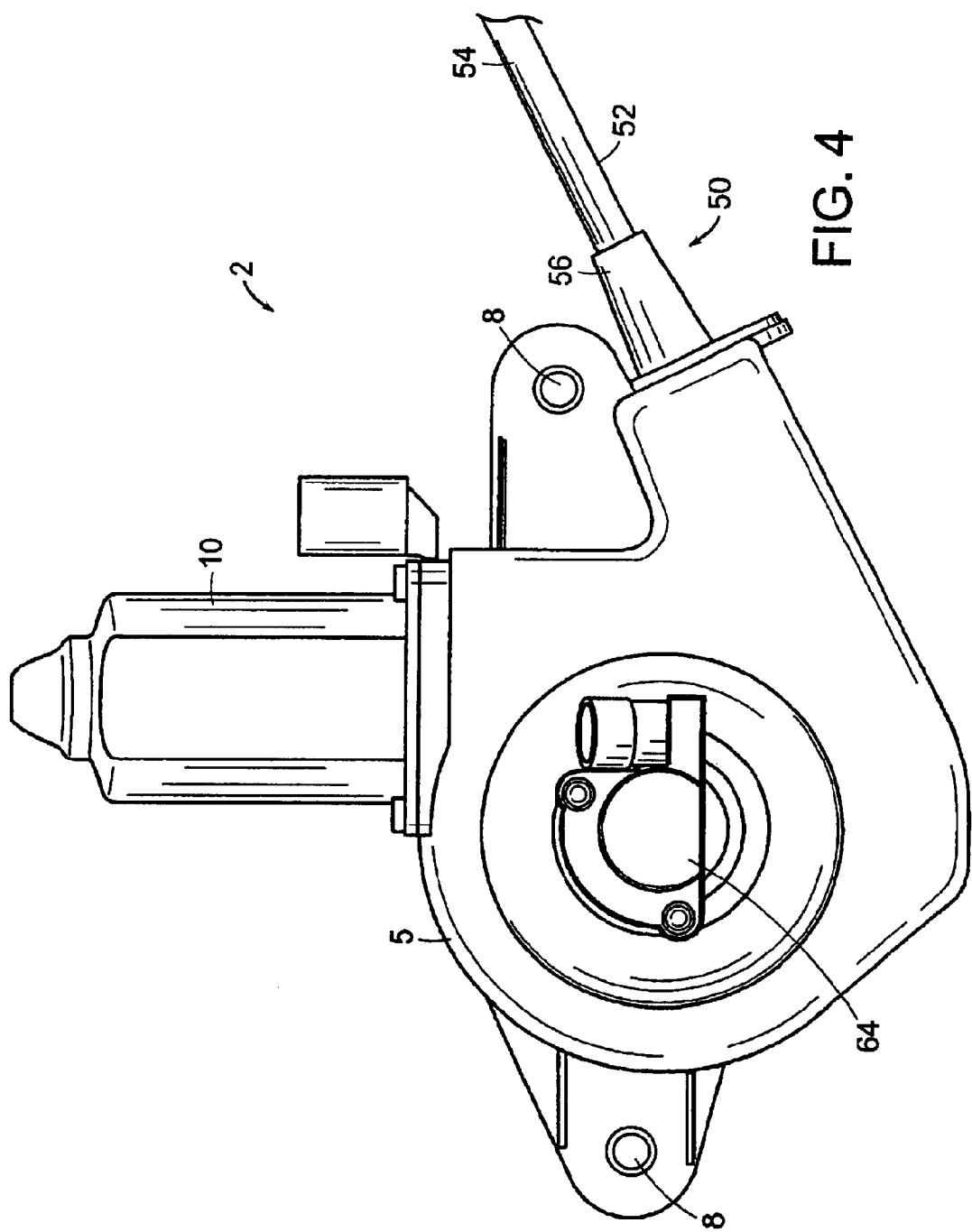
FIG. 4 is an elevation view of the actuator of FIG. 1, shown in assembled form within its housing.

In certain preferred embodiments, a position sensor 64 is used to determine the gear position of transmission 3. In the illustrated embodiment, position sensor 64 makes this determination based on the rotational position of the transmission shifting shaft. Position sensor 64 is secured to cover 5 of housing 4, as seen in FIG. 4. As can be seen in FIG. 2, the transmission shifting shaft extends through aperture 32 of housing 4, aperture 49 of gear 26, aperture 34 of hub 30a, an aperture 66 formed in cover 5, and into position sensor 64. As the gears in transmission 3 change and the transmission shifting shaft rotates, position sensor 64 determines the gear position of transmission 3 and sends a signal via a cable (not shown) to control unit 18.

In the illustrated embodiment, position sensor 64 is seen to be an independent unit mounted to housing 4 of actuator 2. It is to be appreciated that in certain preferred embodiments, a position sensor could be incorporated within motor 10. Such a position sensor would determine the gear position of transmission 3 based on the number of revolutions of shaft 12 of motor 10. Other examples of position sensors include linear and non-linear types, and contact and non-contact type switches, as are well known in the art. It is to be appreciated that other suitable position sensors for determining the gear of the transmission are considered to be within the scope of the present invention and such other sensors will be readily apparent to those skilled in the art, given the benefit of this disclosure.

When actuator 2 is operated in a shift-by-wire mode, release cable 52 is stationary, and ring gear 42 is locked into a fixed position (typically the Park position for transmission 3) by way of its connection to release cable 52. When the user selects a gear into which transmission 3 is to be shifted, a signal is sent from shifter 14 to control unit 18, which in turn sends a signal through cable 20 to activate motor 10. Teethed shaft 12 of motor 10 consequently rotates, drivingly engaging gear 26 of worm gear 24. Sun gear 44 in turn rotates with gear 26 and engages planet gears 46. Since ring gear 42 is fixed in the shift-by-wire mode, sun gear 44 provides the input for planet gear set 40, and the rotation of sun gear 44 is transmitted through planet gears 46 to cause planet carrier 48 and, correspondingly, hub 30a to rotate. When hub 30a and the transmission shifting shaft engaged by hub 30a have rotated sufficiently to move the transmission into the selected gear, position sensor 64 sends a signal by way of a cable 65 to control unit 18, which in turn sends a signal to motor 10 through cable 20 to deactivate motor 10.

When actuator 2 is operated in a manual override mode, shifter 14 moves release cable 52, and more specifically, core element 58 is pushed or pulled in a desired direction. As core element 58 is pushed or pulled by the user to change gears, ring gear 42 rotates. In the manual override mode, sun gear 44 is fixed, since motor 10 is not actuated and worm gear 24 has a self-locking function as described above. Thus, ring gear 42 becomes the input for planet gear set 40, driving planet carrier 48 and hub 30a to rotate through its engagement with planet gears 46. The rotation of hub 30a is transmitted through the transmission shifting shaft to change the gears of transmission 3.

Accordingly, the user is able to mechanically shift transmission 3 through shifter 14, release member 50 and actuator 2 in a manual override mode. Consequently, the user is able to shift the transmission out of Park for towing of the vehicle, or for manually shifting the transmission in the event of failure of the shift-by-wire actuation system. Thus, actuator 2 advantageously allows operation of transmission 3 at all times, either in the normal shift-by-wire mode, or, in the event of a power loss or other system failure, in a manual override mode. Actuator 2 has a compact design and is configured to be easily adapted to most existing automatic transmissions.

Figure 6:
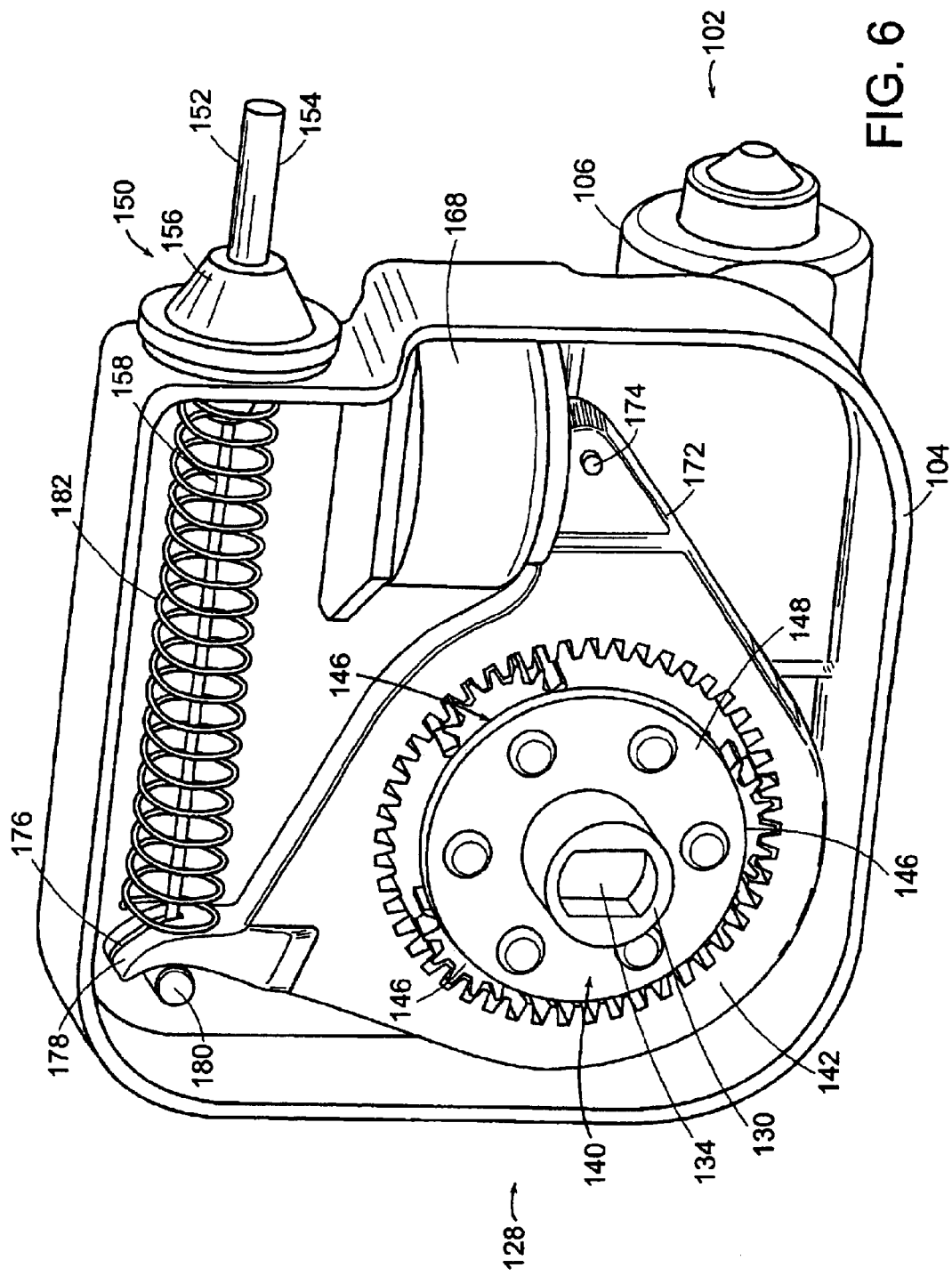
FIG. 6 is a perspective front view of an alternative embodiment of the actuator of FIG. 1, shown in assembled form without its housing without its cover.
Figure 7:
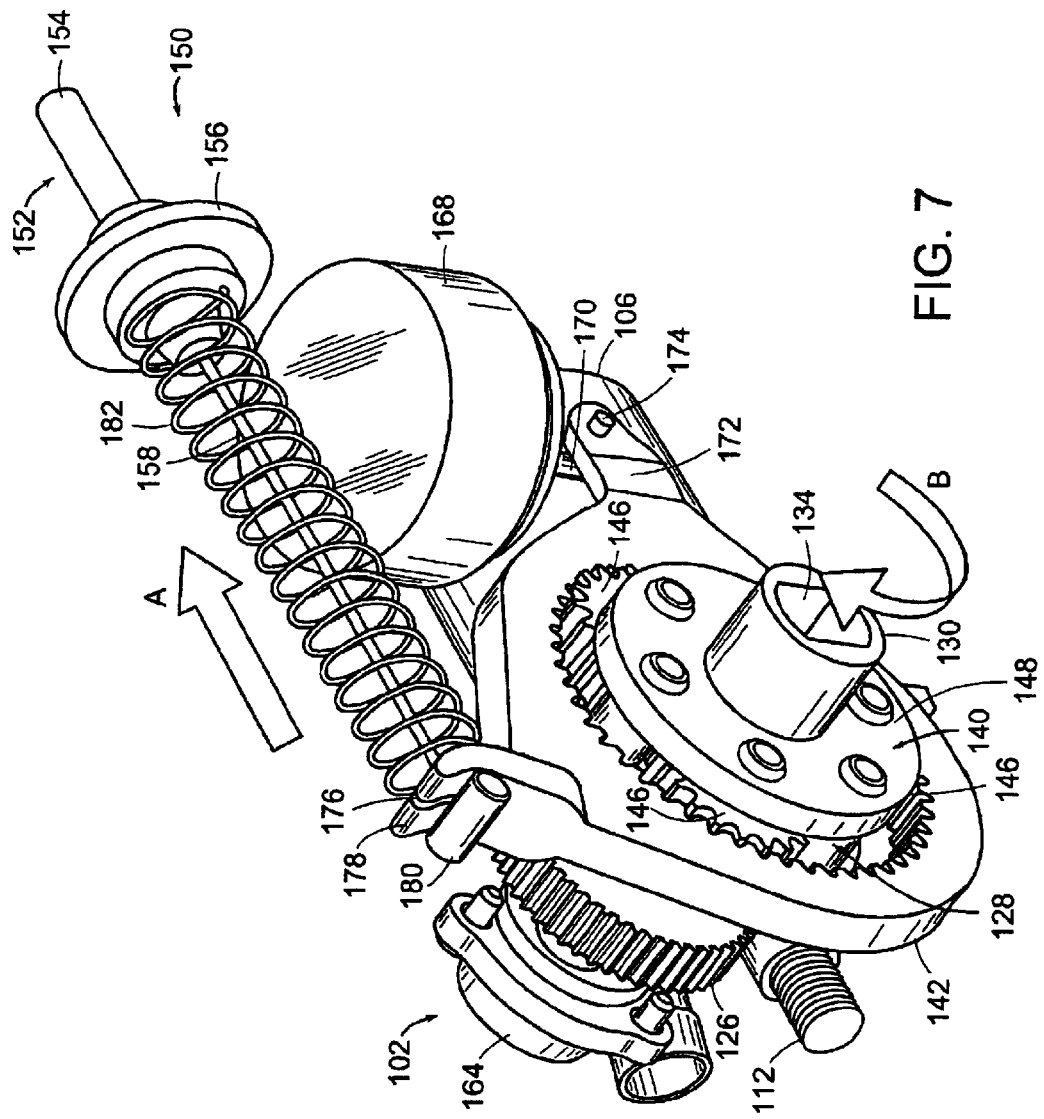
FIG. 7 is a perspective view of the actuator of FIG. 6, shown in assembled form without the housing, and illustrating manual operation of the actuator.

In another preferred embodiment, shown in FIGS. 6 and 7, an actuator 102 is shown with a gear assembly 128 positioned in a housing 104. Similar to the embodiment described above, gear assembly 128 has a planet gear set 140 formed of a ring gear 142, a sun gear (not seen in this view), and three planet gears 146 housed in a planet carrier 148. Hub 130 extends from planet carrier 148 such that hub 130 rotates with planet carrier 148 and aperture 134 extends through both hub 130 and planet carrier 148. A motor 106 drives shaft 112 of worm gear 124, causing gear 126 to rotatingly drive the sun gear and planet gear set 140 in a manner similar to the embodiment described above.

In this embodiment, a solenoid 168 is provided, and serves to secure ring gear 142 in a fixed position (typically corresponding to the Park position for transmission 3) during shift-by-wire mode as seen in FIG. 6. Solenoid 168 has a rod 170 that is secured to a flange 172 of ring gear 142 by way of a pin 174. When energized, as seen in FIG. 6, solenoid 168 serves to fix ring gear 142 in the fixed position.

A release member 150 is formed of a release cable 152 having a sheath 154 secured at one end with a fitting 156 to housing 104 and at its other end to shifter 14. Extending through sheath 154 is a flexible core element 158. Examples of suitable core elements include twisted wire strands and solid wire. Core element 158 extends through an aperture in housing 4 and is received in a slot 176 formed in a flange 178 of ring gear 142. A fitting 180 at the end of core element 158 engages flange 178. A biasing member, such as a coil spring 182 is positioned about core element 158 between flange 178 of ring gear 142 and housing 104, and serves to bias ring gear 142 into a pre-selected fixed position. Other suitable biasing members, including other types of springs, that would act to bias ring gear 142 into a fixed position will become readily apparent to those skilled in the art, given the benefit of this disclosure. As noted above, ring gear 142 is typically biased by spring 182 into a fixed position that corresponds to the Park position of transmission 3.

When actuator 102 is operated in the manual override mode, as illustrated in FIG. 7, solenoid 168 is not energized, allowing ring gear 142 to rotate. As release cable 152 is pulled in the direction of Arrow A, fitting 180 engages flange 178 causing ring gear 142 to correspondingly rotate. As noted above, in the manual override mode, the sun gear is fixed, such that ring gear 142 becomes the input for planet gear set 140. As ring gear 142 rotates, it engages planet gears 146, which in turn drive the sun gear and hub 130 to rotate in the direction of Arrow B. The transmission shifting shaft correspondingly rotates to shift transmission 3 to the desired gear. Position sensor 164 determines the gear to which transmission 3 has been shifted.

While the invention has been described with respect to specific examples including presently preferred modes of carrying out the invention, those skilled in the art will appreciate that there are numerous variations and permutations of the above described actuator that fall within the spirit and scope of the invention as set forth in the appended claims.

I claim:

1. An actuator for a vehicle transmission, the actuator having both a shift-by-wire mode and a manual override mode, comprising, in combination:
   a motor;
   a gear assembly driven by the motor when the vehicle transmission is in a shift-by-wire mode and having an output member configured to mate with the vehicle transmission; and
   a release member operable to drive the gear assembly to shift the vehicle transmission out of Park and for manually shifting the gears of the vehicle transmission when the vehicle transmission is in a manual override mode.

2. The actuator of claim 1, wherein the gear assembly comprises a planet gear assembly.

3. The actuator of claim 2, wherein the planet gear assembly comprises a sun gear, a ring gear, a planet carrier and three planet gears.

4. The actuator of claim 3, further comprising a solenoid operably connected to the ring gear.

5. The actuator of claim 3, wherein the output member is driven by the planet carrier.

6. The actuator of claim 5, wherein the output member comprises a hub on the planet carrier having an aperture extending therethrough.

7. The actuator of claim 3, wherein the release member comprises a cable secured at one end to the ring gear.

8. The actuator of claim 7, wherein the cable is a push-pull cable.

9. The actuator of claim 3, wherein the release member secures the ring gear in a fixed position during the shift-by-wire mode of the vehicle transmission.

10. The actuator of claim 1, further comprising a worm gear driven by the motor and operable to drive the gear assembly.

11. The actuator of claim 10, wherein a teethed shaft of the worm gear is a shaft of the motor.

12. The actuator of claim 1, further comprising a position sensor to detect a gear position of the vehicle transmission.

13. The actuator of claim 1, wherein the release member comprises a cable secured at one end to the gear assembly.

14. The actuator of claim 13, further comprising a shifter, the cable secured at its other end to the shifter.

15. The actuator of claim 14, further comprising a control unit connected to the shifter and the motor.

16. The actuator of claim 1, wherein the release member includes a biasing member to bias the ring gear into a fixed position during the shift-by-wire mode of the vehicle transmission.

17. The actuator of claim 16, wherein the biasing member is a spring.

18. An actuator for a vehicle transmission, the actuator having both a shift-by-wire mode and a manual override mode, comprising, in combination:
   a motor;
   a planet gear assembly having a sun gear, a ring gear, and a planet carrier housing at least one planet gear, the planet carrier configured to mate with the vehicle transmission;
   a worm gear driven by the motor, the worm gear operably connected to the sun gear to drive the planet gear assembly when the vehicle transmission is in a shift-by-wire mode; and
   a release member operably connected to the ring gear to fix the ring gear in a pre-selected position when the solenoid is energized and drive the planet gear assembly to shift the vehicle transmission out of Park and for manually shifting the gears of the vehicle transmission when the vehicle transmission is in a manual override mode.

19. An actuator for a vehicle transmission, the actuator having both a shift-by-wire mode and a manual override mode, comprising, in combination:
   a housing;
   a motor secured to the housing;
   a planet gear assembly positioned in the housing and having a sun gear, a ring gear, and a planet carrier having at least one planet gear and a hub, the hub configured to mate with the vehicle transmission;
   a worm gear comprising a drive shaft of the motor and a gear, the gear engaging the sun gear to drive the planet gear assembly when the vehicle transmission is in a shift-by-wire mode; and
   a cable connected at one end to the ring gear to fix the ring gear in a pre-selected position when the vehicle transmission is in a shift-by-wire mode and drive the planet gear assembly to shift the vehicle transmission out of Park and for manually shifting the gears of the vehicle transmission when the vehicle transmission is in a manual override mode.

20. An actuator assembly for a vehicle transmission, the actuator having both a shift-by-wire mode and a manual override mode, comprising, in combination:

a motor;

a planet gear assembly having a sun gear, a ring gear, a planet carrier housing three planet gears, and a hub configured to mate with the vehicle transmission;

a worm gear driven by the motor, the worm gear operably connected to the sun gear to drive the planet gear assembly when the vehicle transmission is in a shift-by-wire mode, a first cable connecting a shifter to a control unit to send a signal indicating a desired gear selected by movement of the shifter when the shifter is operated in a shift-by-wire mode;

a second cable connecting the control unit to the motor to send signals to activate and deactivate the motor;

a release member connected at one end to the shifter and at its other end to the ring gear to fix the ring gear in a pre-selected position when the vehicle transmission is in a shift-by-wire mode and drive the planet gear assembly to shift the vehicle transmission out of Park and for manually shifting the gears of the vehicle transmission when the shifter is operated in a manual override mode; and a position sensor to determine a gear position of the vehicle transmission.

21. The actuator of claim 1 in which the release member is configured to allow changing between gears of the vehicle transmission in the manual override mode.

22. The actuator of claim 21 in which the changing of the gears releases the automatic transmission.

* * * * *